(12) United States Patent
Cole et al.

(10) Patent No.: US 11,381,802 B2
(45) Date of Patent: *Jul. 5, 2022

(54) METHODS AND APPARATUS FOR CAPTURING IMAGES OF AN ENVIRONMENT

(71) Applicant: Nevermind Capital LLC, Wilmington, DE (US)

(72) Inventors: David Cole, Aliso Viejo, CA (US); Alan McKay Moss, Laguna Beach, CA (US); Michael P. Straub, Colts Neck, NJ (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,377

(22) Filed: Jun. 30, 2020

(65) Prior Publication Data

US 2020/0404244 A1  Dec. 24, 2020

Related U.S. Application Data

(63) Continuation of application No. 16/267,369, filed on Feb. 4, 2019, now Pat. No. 10,721,457, which is a (Continued)

(51) Int. Cl.
*H04N 13/232* (2018.01)
*H04N 13/239* (2018.01)
(Continued)

(52) U.S. Cl.
CPC ........... *H04N 13/232* (2018.05); *G02B 13/06* (2013.01); *G02B 30/34* (2020.01); *H04N 5/2254* (2013.01);
(Continued)

(58) Field of Classification Search
None
See application file for complete search history.

(56) References Cited

U.S. PATENT DOCUMENTS 3,608,458 A    9/1971  Ratliff, Jr.
6,802,614 B2 * 10/2004  Haldiman ............ G03B 21/005
                                                                353/30
(Continued)

FOREIGN PATENT DOCUMENTS

JP    2004311594 A    11/2004
WO    2012004783 A2    1/2012

OTHER PUBLICATIONS

Boluda, et al., "A newfoveated space-variant camera for robotic applications," IEEE Conference on Electronics, Circuit and Systems, Oct. 1996.
(Continued)

*Primary Examiner* — Reza Aghevli
(74) *Attorney, Agent, or Firm* — Blank Rome LLP

(57) ABSTRACT

Customer wide angle lenses and methods and apparatus for using such lenses in individual cameras as well as pairs of cameras intended for stereoscopic image capture are described. The lenses are used in combination with sensors to capture different portions of an environment at different resolutions. In some embodiments ground is capture at a lower resolution than sky which is captured at a lower resolution than a horizontal area of interest. Various asymmetries in lenses and/or lens and sensor placement are described which are particularly well suited for stereoscopic camera pairs where the proximity of one camera to the adjacent camera may interfere with the field of view of the cameras.

19 Claims, 8 Drawing Sheets

Related U.S. Application Data continuation of application No. 15/239,823, filed on Aug. 17, 2016, now Pat. No. 10,200,672.

(51) Int. Cl.

| | |
|---|---|
| *H04N 13/296* | (2018.01) |
| *H04N 13/25* | (2018.01) |
| *H04N 13/243* | (2018.01) |
| *H04N 5/247* | (2006.01) |
| *G02B 30/34* | (2020.01) |
| *G02B 13/06* | (2006.01) |
| *H04N 5/225* | (2006.01) |
| *H04N 5/232* | (2006.01) |

(52) U.S. Cl.
CPC ....... *H04N 5/2258* (2013.01); *H04N 5/23238* (2013.01); *H04N 5/247* (2013.01); *H04N 13/239* (2018.05); *H04N 13/243* (2018.05); *H04N 13/25* (2018.05); *H04N 13/296* (2018.05)

(56) References Cited

U.S. PATENT DOCUMENTS

| | | | |
|---|---|---|---|
| 8,451,320 B1 | 5/2013 | Cole | |
| 8,610,757 B2 | 12/2013 | Cole | |
| 8,723,959 B2* | 5/2014 | Corcoran | H04N 5/23238 |
| | | | 348/169 |
| 8,947,501 B2* | 2/2015 | Corcoran | H04N 5/217 |
| | | | 348/36 |
| 8,982,180 B2* | 3/2015 | Corcoran | H04N 5/23219 |
| | | | 348/36 |
| 9,055,216 B1* | 6/2015 | Taylor | H04N 5/23293 |
| 9,204,127 B1 | 12/2015 | Cole | |
| 9,313,474 B1 | 4/2016 | Cole | |
| 9,407,902 B1 | 8/2016 | Cole | |
| 9,479,732 B1* | 10/2016 | Saleh | H04N 5/232 |
| 9,485,494 B1 | 11/2016 | Cole | |
| 9,538,160 B1 | 1/2017 | Cole | |
| 9,580,013 B2* | 2/2017 | Wierich | G02B 5/10 |
| 9,699,437 B2 | 7/2017 | Cole | |
| 9,729,850 B2 | 8/2017 | Cole | |
| 9,821,920 B2 | 11/2017 | Cole | |
| 9,832,449 B2 | 11/2017 | Cole | |
| 9,832,450 B2 | 11/2017 | Cole | |
| 9,836,845 B2 | 12/2017 | Cole | |
| 9,865,055 B2 | 1/2018 | Cole | |
| 9,894,350 B2 | 2/2018 | Cole | |
| 9,912,965 B2 | 3/2018 | Cole | |
| 9,918,136 B2 | 3/2018 | Cole | |
| 9,930,318 B2 | 3/2018 | Cole | |
| 9,955,147 B2 | 4/2018 | Cole | |
| 10,200,672 B2* | 2/2019 | Cole | H04N 5/23238 |
| 10,250,800 B2* | 4/2019 | Taylor | H04N 5/23238 |
| 2003/0098957 A1* | 5/2003 | Haldiman | G03B 21/005 |
| | | | 353/69 |
| 2012/0008103 A1* | 1/2012 | Lalley | G09B 23/22 |
| | | | 353/69 |
| 2012/0106866 A1* | 5/2012 | Minakawa | G06T 5/006 |
| | | | 382/274 |
| 2012/0249725 A1* | 10/2012 | Corcoran | G06T 3/0062 |
| | | | 348/36 |
| 2012/0249726 A1* | 10/2012 | Corcoran | G06T 3/0062 |
| | | | 348/36 |
| 2012/0249727 A1* | 10/2012 | Corcoran | H04N 5/3572 |
| | | | 348/E5.078 |
| 2012/0250937 A1* | 10/2012 | Corcoran | H04N 5/23238 |
| | | | 382/103 |
| 2013/0235149 A1* | 9/2013 | Tanaka | H04N 5/23238 |
| | | | 348/36 |
| 2014/0055661 A1* | 2/2014 | Imamura | G02B 27/286 |
| | | | 348/342 |
| 2014/0293057 A1* | 10/2014 | Wierich | G02B 5/10 |
| | | | 348/148 |
| 2014/0333729 A1* | 11/2014 | Pflug | G06T 15/00 |
| | | | 348/47 |
| 2015/0207990 A1* | 7/2015 | Ford | G02B 13/06 |
| | | | 348/262 |
| 2015/0271395 A1* | 9/2015 | Taylor | G06T 5/00 |
| | | | 348/207.1 |
| 2015/0341617 A1 | 11/2015 | Cole | |
| 2015/0346812 A1 | 12/2015 | Cole | |
| 2015/0346832 A1 | 12/2015 | Cole | |
| 2016/0004300 A1* | 1/2016 | Baic | G06F 3/017 |
| | | | 345/419 |
| 2016/0065946 A1 | 3/2016 | Cole | |
| 2016/0065947 A1 | 3/2016 | Cole | |
| 2016/0080728 A1 | 3/2016 | Cole | |
| 2016/0150156 A1* | 5/2016 | Okumura | H04N 5/2253 |
| | | | 348/36 |
| 2016/0212403 A1 | 7/2016 | Cole | |
| 2016/0212409 A1 | 7/2016 | Cole | |
| 2016/0219262 A1 | 7/2016 | Cole | |
| 2016/0219305 A1 | 7/2016 | Cole | |
| 2016/0227190 A1 | 8/2016 | Cole | |
| 2016/0239978 A1 | 8/2016 | Cole | |
| 2016/0241836 A1 | 8/2016 | Cole | |
| 2016/0241837 A1 | 8/2016 | Cole | |
| 2016/0241838 A1 | 8/2016 | Cole | |
| 2016/0241892 A1 | 8/2016 | Cole | |
| 2016/0253795 A1 | 9/2016 | Cole | |
| 2016/0253809 A1 | 9/2016 | Cole | |
| 2016/0253810 A1 | 9/2016 | Cole | |
| 2016/0253839 A1 | 9/2016 | Cole | |
| 2016/0255326 A1 | 9/2016 | Cole | |
| 2016/0255327 A1 | 9/2016 | Cole | |
| 2016/0269716 A1 | 9/2016 | Cole | |
| 2016/0301836 A1* | 10/2016 | Hjelmström | H04N 5/232945 |
| 2016/0353021 A1* | 12/2016 | Murakami | H04N 5/23222 |
| 2016/0356997 A1* | 12/2016 | Inomoto | G02B 15/177 |
| 2016/0360180 A1 | 12/2016 | Cole | |
| 2016/0373734 A1 | 12/2016 | Cole | |
| 2017/0050743 A1 | 2/2017 | Cole | |
| 2017/0061600 A1 | 3/2017 | Cole | |
| 2017/0076477 A1* | 3/2017 | Nakakusu | G06T 3/0062 |
| 2017/0094247 A1 | 3/2017 | Cole | |
| 2017/0150122 A1 | 5/2017 | Cole | |
| 2017/0161563 A1* | 6/2017 | Cetin | G06V 10/50 |
| 2017/0264832 A1* | 9/2017 | Yoshizawa | H04N 5/23203 |
| 2017/0272650 A1* | 9/2017 | Lee | H04N 5/23229 |
| 2017/0278263 A1* | 9/2017 | Tanaka | G06V 10/147 |
| 2017/0299686 A1* | 10/2017 | Bertin | G01J 5/0014 |
| 2017/0324945 A1 | 11/2017 | Cole | |
| 2017/0345136 A1* | 11/2017 | Van der Auwera | G06T 5/006 |
| 2017/0359564 A1 | 12/2017 | Cole | |
| 2017/0363741 A1* | 12/2017 | Send | H04N 5/335 |
| 2018/0020206 A1 | 1/2018 | Sheridan | |
| 2018/0024419 A1 | 1/2018 | Sheridan | |
| 2018/0025478 A1* | 1/2018 | Lee | H04N 5/247 |
| | | | 382/284 |
| 2018/0027152 A1 | 1/2018 | Sheridan | |

OTHER PUBLICATIONS

Hughes, et al., "Accuracy offish-eye lens models," Applied Optics, Jun. 10, 2010, vol. 49, No. 17.

\* cited by examiner

METHODS AND APPARATUS FOR CAPTURING IMAGES OF AN ENVIRONMENT

RELATED APPLICATIONS

The present application is a continuation of U.S. patent application Ser. No. 16/267,369 filed Feb. 4, 2019 which is a continuation of U.S. patent application Ser. No. 15/239,823 filed Aug. 17, 2016, said patent applications being hereby expressly incorporated by reference their entirety.

FIELD

The present application relates to methods and apparatus for use in capturing images of an environment, e.g., images which can be used by a playback device to simulate an environment in a non-stereoscopic or stereoscopic format.

BACKGROUND

Stereoscopic image capture of real world environments is of growing importance as 3D viewing devices, e.g., head mounted displays, capable of displaying different images to a users left and right eyes are becoming more common. For example, the capture of images of a sporting event or other event such as a concert using cameras and then transmitting the images to be used as textures on the surfaces of a simulated environment can give a user of a playback device a sense of being at the event.

To capture images of an event for such purposes wide angle lenses, such as a circular fisheye lenses, are often used. FIG. 1 illustrates the shape of a circular fish eye lens 100 as seen from the front. The circular fish eye lens is common and frequently used to capture images of an environment. Such a lens has a shape which approximates that of a half sphere. Circular fisheye lenses normally take in a 180° hemisphere and project this as a circle on the camera sensor such as the sensor 200 shown in FIG. 2. Camera sensors are normally rectangular with one side being longer than the other.

Circular fish eye lenses allow for the capture of a very wide angle, e.g., 180 or approximately 180 degrees in both the horizontal and vertical dimensions. This can be particularly useful when capturing images which are to be used in simulating a complete 360 degree environment in both vertical and horizontal directions since a full or nearly full view can be captured with as little as two lenses.

Unfortunately, the use of circular fish eye lenses have the drawback that they are inefficient in terms of available pixel sensor elements with much of the sensor area including pixel sensors being wasted. FIG. 2 shows how light 101 passing through the fish eye lens 100 will typically fall on a sensor 200 of a camera device when the fish eye lens 100 is used. Note that the pixel sensor outside the region 101 in which light falls are wasted leaving many of the pixel elements of sensor 200 unused.

In an attempt to address the failure of circular fish eye lenses to use the full area of a sensor, fisheye lenses that enlarged the image circle to cover the entire sensor area were developed with such lenses sometimes being referred to as full-frame fisheye lenses.

The picture angle produced by conventional full-frame fish eye lenses only measures 180 degrees when measured from corner to corner. Such lenses have a 180° diagonal angle of view, while the horizontal and vertical angles of view will be smaller. For an equisolid angle-type 15 mm full-frame fisheye, the horizontal FOV will be 147°, and the vertical FOV will be 94°.

Such full-frame fisheye lenses treat the top and bottom portions of the environment equally with the same number of pixel elements of the sensor being allocated to the top horizontal portion of a FOV as to the bottom horizontal portion of a field of view. It should be appreciated that conventional full-frame fish eye lenses tend to be symmetric with respect to the left and right portions of the field of view as well as the top and bottom portions of the field of view in the same manner that circular fish eye lenses are symmetric in the horizontal and vertical directions.

While conventional circular fisheye lenses and conventional full frame fisheye lenses have a wide range of applications, they are not as well suited to the capture of images of real world environments for virtual reality applications as many people would desire.

As should be appreciated, users of a virtual reality device tend not to give the same importance to all portions of an environment. For example, the ground may be of little interest to a user of a virtual reality device. In the case of the capture of images for virtual reality, both non-stereoscopic and/or stereoscopic virtual reality, it would be desirable if different portions of the environment could be captured in a manner that uses sensor pixel elements in a way that reflects the relative importance of various portions of the environment to a user of a virtual reality device, e.g., with higher priority portions of an environment being captured at higher resolution than lower priority portions.

Some virtual reality applications do not involve the use of stereoscopic images or use stereoscopic image pairs generated synthetically from images captured by multiple cameras and depth information. However real time 3D image content capture and streaming often involves the use of camera pairs to capture images which are intended to serve as left and right eye images. Slight differences in the left and right images of a stereoscopic image pair provide depth information allowing a user viewing different left and right images to perceive the images in 3D. Such capture of stereoscopic image pairs can avoid the need for manipulating an image to synthetically generate a corresponding image to be used as one image of a stereoscopic image pair. Such processing can be computationally difficult and time consuming making such processing unsuitable for some real time applications.

While not important for all applications, it would be desirable if at least some consideration were given in the development and use of wide angle lenses to how they operate in a stereoscopic pair and methods and/or apparatus be developed which facilitate the use of wide angle lenses in a stereoscopic camera pair.

In view of the above discussion, it should be appreciated that there is a need for improved methods and/or apparatus relating to wide angle lenses or devices which use such lenses in capturing images intended to support virtual reality applications whether such applications are non-stereoscopic or stereoscopic applications.

SUMMARY

Methods and apparatus for capturing images which are well suited for use in environmental simulations are described. The methods and apparatus can be used to capture stereoscopic or non-stereoscopic images which can be processed and transmitted to a playback device for use in an environmental simulation, e.g., to give a user of a playback device a sense of being present at an event such as a sports game or concert where the images are captured.

In various embodiments, wide angle lenses, e.g., custom fish eye lenses, which make efficient use of a camera sensors limited pixel sensors, are used. The custom fish eye lenses have a larger vertical and/or horizontal field of view (FOV) than standard full-frame fisheye lenses with a horizontal FOV of 147°, and a vertical FOV of 94°.

In various embodiments the vertical FOV of the custom fish eye lenses is at least 120 degrees but in many embodiments 160 degrees or more with the FOV being at least 180 degrees in some embodiments. In some but not necessarily all embodiments the horizontal FOV of the custom fish eye lenses is greater than 120 degrees but in many cases is in excess of 150 degrees and in some embodiments over 160 degrees. The horizontal FOV is 180 degrees in some embodiments.

In various embodiments the custom fish eye lens is used in combination with a sensor to capture images with different resolutions for different portions of the environment. Portions of the sky and ground are often captured using the fish eye lenses at lower resolution than a horizontal band corresponding to an area that may be described as the horizon in the field of view of the lens.

In some but not all embodiments the lens is configured so that images of sky portions are captured at lower resolution than horizon portions but with ground portions being captured at even a lower resolution than either the sky or horizon portions of the environment. Such differences in image capture may be, and sometimes are, due to vertical asymmetries in a lens used to capture an image or images of the environment.

Various horizontal asymmetries are used in some embodiments in which fish eye lenses are used in left and right cameras of a camera pair used for stereoscopic image capture. In various embodiments horizontal lens asymmetries are used to avoid or minimize a left lens of a camera pair capturing an image portion including the right camera or right camera lens. Similarly a right lens of a camera pair may include a horizontal asymmetry designed to minimize capturing of an image of the right camera or right camera lens. In at least one embodiment the right camera uses an asymmetric lens which is the same as the one used in the left camera but with the lens mounted in an inverted manner in the right camera as compared to the left camera.

While in some embodiments the horizontal asymmetry between left and right camera image capture is achieved by using asymmetric camera lenses, in other embodiments the placement of the left camera lens relative to the sensor of the left camera is shifted as compared to the placement of the right camera lens to the sensor of the right camera. In this way, portions of light passing through the right and left camera lenses which correspond to a portion of the adjacent camera of the camera pair will miss the sensor of the camera in which the lens is mounted allowing the individual pixel elements sensors of each camera sensor to be used to capture meaningful portions of the environment rather than images of the adjacent camera or lens.

Various features of the present invention can be used alone or in combination and the described combinations are intended to be exemplary and not limiting. For example, while various features are described as being used to capture stereoscopic image content using pairs of cameras, the methods and apparatus can be used with single cameras to capture non-stereoscopic images of an environment.

Numerous additional features benefits and embodiments are described in the detailed description which follows.

DETAILED DESCRIPTION

Methods and apparatus are directed to wide angle lenses and apparatus using wide angle lenses which are well suited for use in capturing images for virtual reality applications. In some embodiments fish eye lenses optimized for capture of images intended for virtual reality applications are used to capture images of an environment. In at least some such embodiments the lenses capture different portions of the environment at different resolutions.

Figure 3:
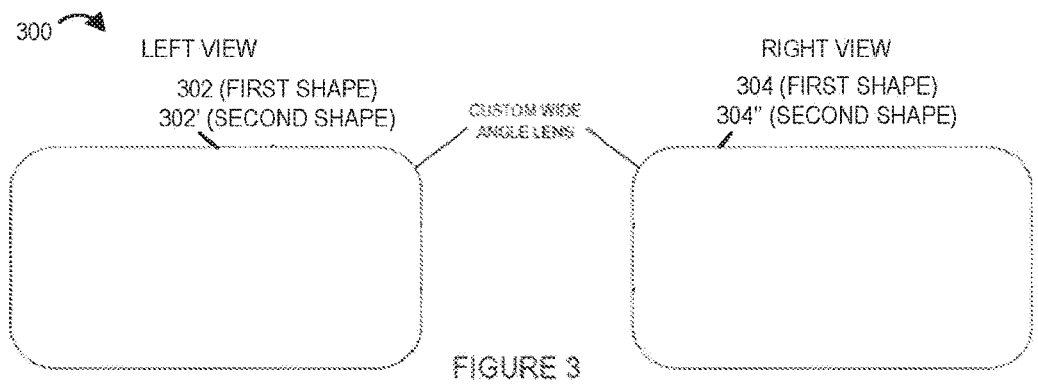
FIG. 3 illustrates custom wide angle lenses, e.g., left and right non-circular fish eye lens.

Drawing 300 of FIG. 3 illustrates exemplary custom wide angle lenses, e.g., left and right non-circular fish eye lens, in accordance with an exemplary embodiment. A first custom wide angle lens pair of the type shown in FIG. 3, having a first shape is represented by lens pair (302, 304). A second custom wide angle lens pair of the type shown in FIG. 3, having a second shape is represented by lens pair (302', 304').

In one embodiment sky and ground portions are intentionally captured at lower resolution by lenses (302, 304) and (302', 304') than portions of the environment corresponding to the horizon. Furthermore, unlike conventional full frame fish eye lenses with vertical fields of view of 147 degrees, the customized fish eye lenses (302, 304) and (302', 304') have a relatively large vertical field of view, e.g. 160 degrees or more in some embodiments. In some embodiments the horizontal field of view is at least 120 degrees but in many embodiments larger, e.g. in many cases with a 140 degree FOV or larger. In some embodiments both the horizontal and vertical fields of view exceed 160 degrees.

Figure 4:
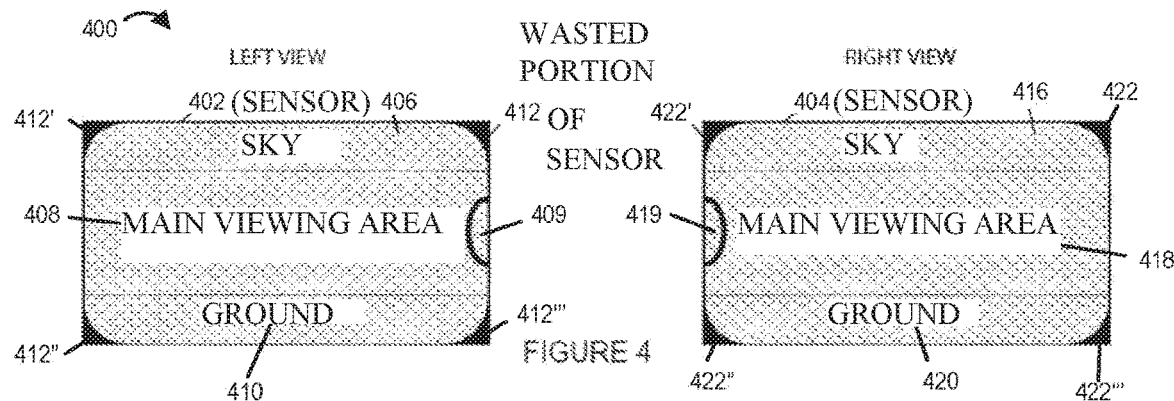
FIG. 4 is a diagram illustrating how custom wide angle lens of the type shown in FIG. 3 and having a first shape capture light from an environment including a sky, ground and horizon portion and direct the light onto the majority of rectangular sensors of left and right cameras of a stereoscopic camera pair in accordance with one embodiment.

FIG. 4 is a drawing 400 illustrating how exemplary custom wide angle lens, e.g., lens (302, 304) of the type shown in FIG. 3 and having a first shape capture light from an environment including a sky, ground and horizon portion and direct the light onto the majority of rectangular sensors (402, 404) of left and right cameras of a stereoscopic camera pair in accordance with one embodiment.

Sensor 402 includes sensor portions (406, 408, 410, 412, 412', 412", 412'''). Sensor portion 406 of sensor 402 captures light from a sky portion of the environment which was directed by lens 302, onto sensor portion 406. Sensor portion 408 of sensor 402 captures light from a main viewing area portion, e.g. horizontal viewing portion, of the environment directed by lens 302 onto sensor portion 408. Sensor portion 410 of sensor 402 captures light from a ground portion of the environment which was directed by lens 302 onto sensor portion 410. Sensor portions (412, 412' 412", 412''') are wasted portions of the rectangular sensor 402. Portion 409 included as part of portion 408 captures a portion of lens 304.

Sensor 404 includes sensor portions (416, 418, 420, 422, 422', 422", 422'''). Sensor portion 416 of sensor 404 captures light from a sky portion of the environment which was directed by lens 304, onto sensor portion 416. Sensor portion 418 of sensor 404 captures light from a main viewing area portion, e.g. horizontal viewing portion, of the environment directed by lens 304 onto sensor portion 418. Sensor portion 420 of sensor 404 captures light from a ground portion of the environment which was directed by lens 304 onto sensor portion 420. Sensor portions (422, 422' 422", 422''') are wasted portions of the rectangular sensor 404. Portion 419 included as part of portion 418 captures a portion of lens 302.

Lenses 302 and 304 are symmetric in their field of view (FOV) in the horizontal and vertical directions. Accordingly lenses 302 and 304 are of the same type and can be used interchangeably.

Unlike the first shape lenses (302, 304) the second shape lenses (302', 304') are asymmetric with respect to the vertical dimension allocating more sensor area for the sky portion and less than the ground portion even though with respect to the horizon these portions maybe of equal size. Thus, in lenses 302' and 304' are symmetric with respect to the vertical axis but not the horizontal axis. Such a user or pixel elements of a sensor can be more efficient since the ground portion is generally of less interest than the sky portions so in allocating a limited number of pixel sensors it is desirable to minimize the number allocated to the ground portion of the environment, maximize the allocation of pixel sensors and thus resolution of the horizon portion and capture the sky at a lower resolution than the horizon portion but higher than the ground portion.

Thus, in some embodiments the custom fish eye lenses (302', 304') are asymmetric with regard to the resolution allocation provided for the vertical field of view and/or are placed in an asymmetric manner over sensors so that the images captured by cameras using the custom fish eye lens (302', 304') will capture a vertical portion of an environment in an asymmetric manner in terms of FOV and/or the resolution of the captured portions of the environment.

In one such embodiment while the vertical FOV may cover a number of degrees which is the same or similar for the sky and ground portions of an environment, but with the sky portion being directed to more pixel elements of the sensor allowing the sky to be captured at a higher resolution than the ground portion. Thus asymmetry in terms of allocation of resolution is particularly useful in the vertical dimension where objects in the sky such a planes, birds, clouds are more likely to be of interest than objects on the ground.

Figure 5:
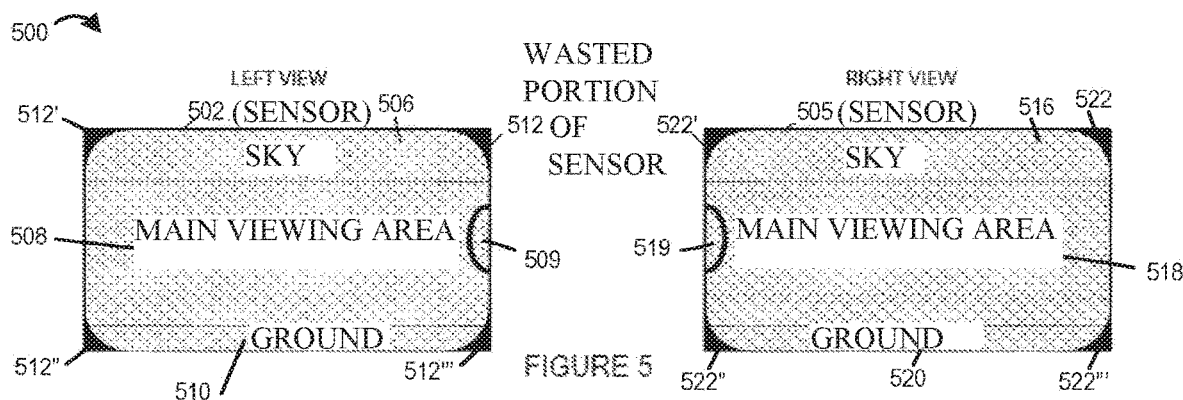
FIG. 5 is a diagram illustrating how custom wide angle lens of the type shown in FIG. 3 and having a second shape capture light from an environment including a sky, ground and horizon portion and direct the light onto the majority of rectangular sensors of left and right cameras of a stereoscopic camera pair in accordance with one embodiment.

FIG. 5 is a drawing 500 illustrating how custom wide angle lens (302', 304') of the type shown in FIG. 3 and having a second shape capture light from an environment including a sky, ground and horizon portion and direct the light onto the majority of rectangular sensors (502, 504) of left and right cameras of a stereoscopic camera pair in accordance with one embodiment where the sensors are asymmetric with regard to the vertical direction but not the horizontal direction.

Sensor 502 includes sensor portions (506, 508, 510, 512, 512', 512", 512'''). Sensor portion 506 of sensor 502 captures light from a sky portion of the environment which was directed by lens 302', onto sensor portion 506. Sensor portion 508 of sensor 502 captures light from a main viewing area portion, e.g. horizontal viewing portion, of the environment directed by lens 302' onto sensor portion 508 at a higher resolution than the sky or ground portions. Sensor portion 510 of sensor 502 captures light from a ground portion of the environment which was directed by lens 302' onto sensor portion 510. Sensor portion 510 is smaller than the sensor area 506 corresponding to the sky portion and captures the ground at a lower resolution than the resolution at which the sky and main horizontal viewing area are captured. Sensor portions (512, 512' 512", 512''') are wasted portions of the rectangular sensor 502. Portion 509 included as part of portion 508 captures a portion of lens 304'.

Sensor 504 includes sensor portions (516, 518, 520, 522, 522', 522", 522'''). Sensor portion 516 of sensor 504 captures light from a sky portion of the environment which was directed by lens 304' which is asymmetric in the vertical direction, onto sensor portion 516. Sensor portion 518 of sensor 504 captures light from a main viewing area portion, e.g. horizontal viewing portion, of the environment directed by lens 304' onto sensor portion 518. Sensor portion 520 of sensor 504 captures light from a ground portion of the environment which was directed by lens 304' onto sensor portion 520. Sensor portions (522, 422' 422", 422") are wasted portions of the rectangular sensor 504. Portion 519 included as part of portion 518 captures a portion of lens 302'. As with sensor 502, the ground is captured at a lower resolution than the sky which is captured at a lower resolution than the main horizontal viewing area.

The FOV of lenses 302', 304' maybe the same as lenses 302, 304 but by using lower resolution for the ground more efficient use of the pixel elements of sensor 502, 505 better image quality can be achieved for the higher priority portions of the environment when images are captured using the lenses 302', 304' on a camera pair than when lenses 302, 304 are used.

Since lenses 302', 304' are symmetric in the horizontal dimension, the same type of lens can be used for either the left or right cameras of a stereoscopic camera pair with the lenses 302', 304' being interchangeable.

Implementations which allow the same type of lenses for left and right cameras of a stereoscopic camera pair can have cost advantages over implementations which involve the use of lenses of different designs for the left and right cameras of a stereo camera pair.

However, asymmetry in the captured FOV and/or resolution allocation in the horizontal dimension is particularly useful when fish eye lenses are used in camera pairs, e.g., for stereoscopic image capture. In such a case the left camera of the camera pair may have its right side view partially obstructed by the right camera of the camera pair but its left field of view unobstructed. Similarly the right camera of the camera pair may have its left side view partially obstructed by the right camera of the camera pair but its right side view unobstructed. Such obstruction results in a sensor capturing a portion 409, 419, 509 or 519 of a lens of an adjacent camera as shown in FIGS. 4 and 5. The capture of a portion of the adjacent lens can be viewed as a waste of pixel sensors when the objective is to capture a quality image of the environment using a limited number of pixels sensors of a camera sensor such as the sensor 402, 404, 502 or 505.

Figure 9:
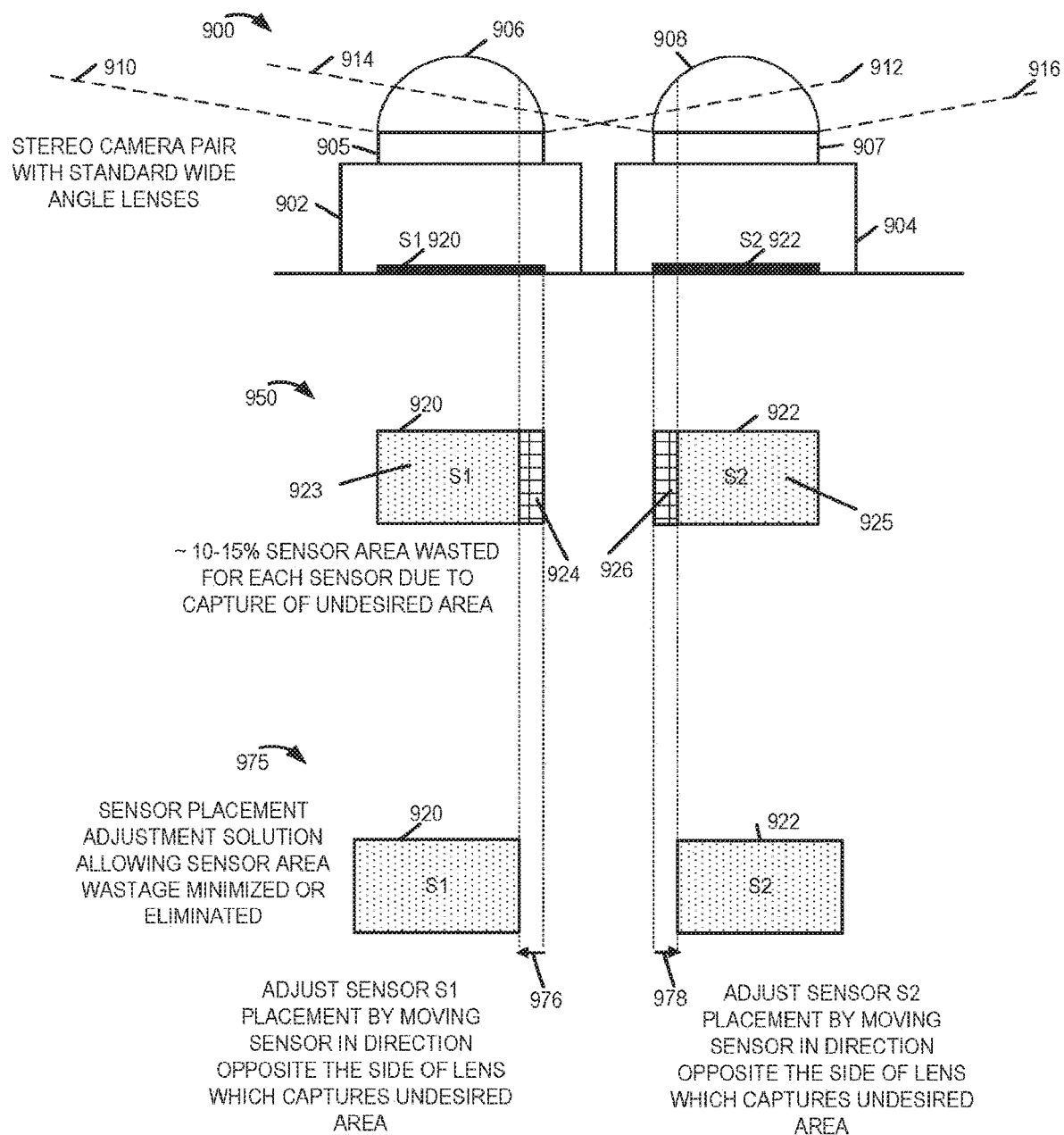
FIG. 9 illustrates a stereoscopic camera pair and how the field of view of a conventional circular fish eye lens may capture an image of a portion of an adjacent camera lens absent careful placement of the camera sensors in accordance with one feature of the invention or use of an asymmetric lens in accordance with another features of the invention.

The problem of capturing an image of a portion of an adjacent lens can be understood with regard to FIG. 9.

In order to avoid wasting the limited number of pixel element sensors on a sensor capturing a view of the adjacent camera or lens of the adjacent camera, custom fish eye lens with asymmetric fields of view can be, and sometimes are, used so that the adjacent camera or lens of the adjunct camera is not captured. Given the symmetry between the left and right cameras, in some embodiments the right camera uses an asymmetric lens which the same as that used in the left camera of the camera pair but with the right lens being inverted as compared to the left lens. In such a case, the left and right cameras use the same type asymmetric lens, but each camera uses the lens in an orientation which avoids or minimizes the capture of an image of a portion of the adjacent camera or lens assembly of the adjacent camera. In one such embodiment the resolution allocation for the sky and ground is the same, but potentially lower than the resolution allocation to the horizon portion of the environment to allow for inverting of the lens in one of the left and right cameras of a stereoscopic camera pair without creating an inconsistency in the resolution allocations between the left and right cameras for portions of the environment.

In some embodiments, rather than use a fish eye lens which is asymmetric in the horizontal dimension for left and right camera pairs, the placement of the left and right sensors is shifted in the left and right cameras corresponding to the lens so that the FOV of the lens which captures the adjacent camera or lens will particularly or fully avoid the sensor of the camera. In this way the pixel sensors of an individual one of the left and right cameras can be utilized to capture portions of the environment that are of interest as opposed to an image of the adjacent camera or camera lens. The asymmetric placement of the custom fish eye lens to the sensor in the left and right cameras of a stereoscopic camera pair is useful in embodiments where the resolution allocation to the sky and ground portions are different making it undesirable to use the same style lens in both left and right cameras of a camera pair but with one of the lenses inverted relative to the other.

As should be appreciated by directing light from different size areas onto a fixed number of pixels for ground and sky luminance differences which may not be present in the actual environment may be introduced into the captured images. For example, if the light from a ground area of one portion, e.g., a first percentage of the FOV, is directed onto a first number of pixels, and the light from a sky portion of the same size, e.g., same percentage of the FOV as the first percentage, is directed, e.g., spread, over twice as many pixels, the ground area will appear excessively bright relative to the sky which is captured at a higher resolution.

In various embodiments, the optical characteristics of the wide angle, e.g., custom fish eye lens, is determined, e.g., based on calibration measurements, and the images captured by the fish eye lens are corrected to compensate for the luminance distortions introduced by the calibrated lens. Chrominance and other optical distortions can also be measured and corrected for in the captured images. Thus, while the fish eye lenses of the invention may capture distorted images of the environment such distortions can be corrected for in post image capture processing. Thus while the lenses used in various embodiments may have various asymmetries, post capture processing can be used to correct for the distortions while allowing efficient use of the limited pixel elements of a sensor in a manner that is optimized for the portions of the environment which are most likely to be of interest to a viewer of the images or image portions during playback by a playback device displaying a simulated environment to a user.

The lenses lens and sensor mounting arrangements, and correction of distortions introduced into the captured images are well suited for use with devices which are intended to capture and display images of a real environment as part of a simulated environment displayed to a user of a playback device whether the environmental simulation be a stereoscopic environmental simulation or non-stereoscopic environmental simulation.

FIG. 9 illustrates a stereoscopic camera pair and how the field of view of a fish eye lens, whether it be a conventional fish eye lens or custom fish eye lens 302, 304, 302' or 304' of the invention may capture an image of a portion of an adjacent camera lens if the sensor is oriented directly under the center of the fish eye lens as is the normal case.

As will be discussed further below careful placement of the camera sensors in accordance with one feature of the invention or use of an asymmetric lens in accordance with another feature of the invention allows the sensors to avoid capturing an image of a lens of an adjacent camera of a stereoscopic camera pair. Drawing 900 illustrates a filed of view for a stereoscopic camera pair (902, 904) each including a fish eye lens (906, 908), respectively. Camera 902 has a field of view within the boundaries of dashed lines 910 and 912. Camera 904 has a field of view within the boundaries of dashed lines 914 and 916. It may be observed that a portion of lens 908 of camera 904 is within the field of view for lens 906 of camera 902.

Similarly, it may be observed that a portion of lens 906 of camera 902 is within the field of view for lens 908 of camera 904. Drawing 900 indicates that sensor S1 920 is mounted in camera 902 to be aligned with the lens collar 905 corresponding to lens 906. Drawing 900 further indicates that sensor S2 922 is mounted in camera 904 to be aligned with the lens collar 907 corresponding to lens 908.

Drawing 950 illustrates that the sensor to lens placement shown in FIG. 900 results in a wasted sensor area for each sensor due to the capture of undesired areas, e.g., including a portion of an adjacent lens. Sensor S1 920 includes a portion 923 which captures a desired area, represented by dotted shading, and a portion 924 which captures an undesired area, represented by crosshatch shading. Sensor S2 922 includes a portion 925 which captures a desired area, represented by dotted shading, and a portion 926 which captures an undesired area, represented by crosshatch shading. For each sensor S1 920, S2 922, the wasted area (924, 926) may be more than 5% and in some cases as much as 10-15% of the total sensor area (920, 922). However this is not the case in all systems and lower amounts of wastage may occur in some systems.

Drawing 975 illustrates a sensor placement adjustment solution, in accordance with a feature of some embodiments of the present invention, in which the sensors (920, 920) are more fully utilized, e.g., minimizing or eliminating wasted sensor area. Sensor S1 is 920 is moved in the direction opposite the side of lens which captures undesired area, as indicated by arrow 976. This adjustment or intentional offset of sensor placement, results in entire or nearly entire sensor 1 920 capturing desired area, as indicated by dotted shading over the region of sensor S1 920. Sensor S1 is 920 is moved in the direction opposite the side of lens which captures undesired area, as indicated by arrow 978. This adjustment or intentional offset of sensor placement, results in entire or nearly entire sensor 2 922 capturing desired area, as indicated by dotted shading over the region of sensor S2 922. Thus the horizontal center of lenses 920 and 922 are not aligned with the horizontal centers of the lenses 906 and 908 as would be the case in a normal camera configuration.

Figure 6:
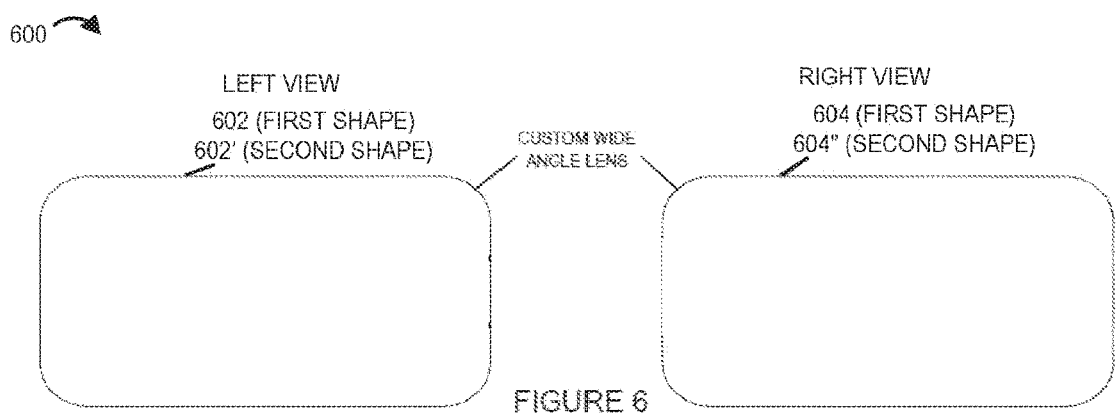
FIG. 6 is a diagram illustrating left and right wide angle lenses similar to the ones shown in FIG. 3 but which are longer than the ones in FIG. 3 in the horizontal dimension such that a portion of the light captured from the environment using the lenses shown in FIG. 6 will miss the rectangular image sensors of left and right cameras in which the lenses of FIG. 6 are mounted and used.
Figure 7:
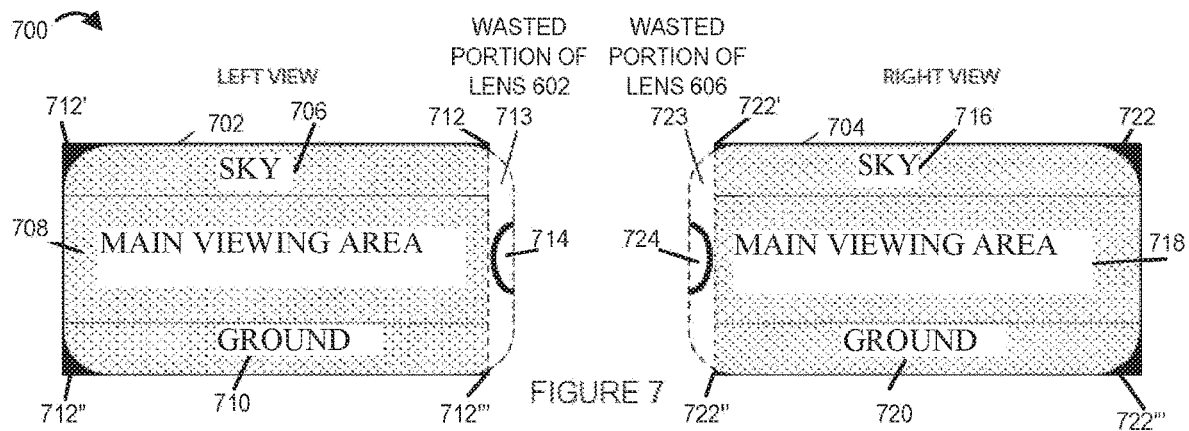
FIG. 7 illustrates how custom wide angle lens of the type shown in FIG. 6 and having a first shape capture light from an environment including a sky, ground and horizon portion and direct the light onto the majority of the rectangular sensors corresponding to left and right cameras of a stereoscopic camera pair in accordance with one embodiment.
Figure 8:
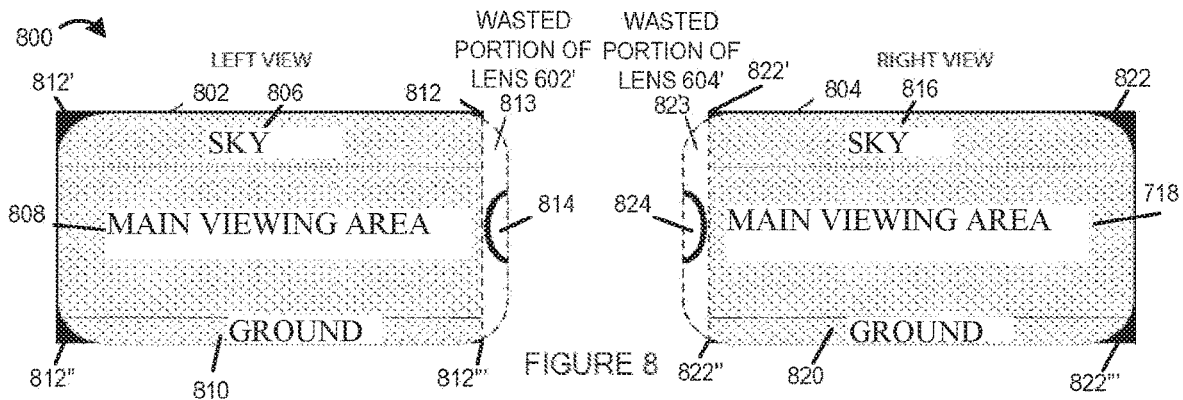
FIG. 8 illustrates how custom wide angle lens of the type shown in FIG. 6 and having a second shape capture light from the environment including a sky, ground and horizon portion and direct the light onto the majority of the rectangular sensors corresponding to the left and right cameras of a stereoscopic camera pair in accordance with another embodiment.

FIGS. 6, 7 and 8 show how the offset alignment shown in FIG. 9 can be used with custom fisheye lenses having fields of view which are the same or similar to those discussed with regard to lenses 302, 302', 304, 304'.

FIG. 6 is a diagram illustrating left and right wide angle lenses ((602 or 602'), (604 or 604')) similar to the ones ((302 or 302'), (304) or 304')) shown in FIG. 3 but which are longer than the ones ((302 or 302'), (304) or 304')) in FIG. 3 in the horizontal dimension such that a portion of the light captured from the environment using the lenses ((602 or 602'), (604 or 604')) shown in FIG. 6 will miss the rectangular image sensors ((702 or 802), (704 or 804)) of left and right cameras in which the lenses ((602 or 602'), (604 or 604')) of FIG. 6 are mounted and used.

Drawing 600 of FIG. 6 illustrates exemplary custom wide angle lenses, e.g., left and right non-circular fish eye lens, in accordance with an exemplary embodiment. A first custom wide angle lens pair of the type shown in FIG. 6, having a first shape is represented by lens pair (602, 604). A second custom wide angle lens pair of the type shown in FIG. 6, having a second shape is represented by lens pair (602', 604').

FIG. 7 is a drawing 700 illustrating how exemplary custom wide angle lens, e.g., lens (602, 604) of the type shown in FIG. 6 and having a first shape capture light from an environment including a sky, ground and horizon portion and direct the light onto the majority of rectangular sensors (702, 704) of left and right cameras of a stereoscopic camera pair in accordance with one embodiment. Sensor 702 includes sensor portions (706, 708, 710, 712, 712', 712", 712'''). Sensor portion 706 of sensor 702 captures light from a sky portion of the environment which was directed by lens 602, onto sensor portion 706. Sensor portion 708 of sensor 702 captures light from a main viewing area portion, e.g. horizontal viewing portion, of the environment directed by lens 602 onto sensor portion 708. Sensor portion 710 of sensor 602 captures light from a ground portion of the environment which was directed by lens 602 onto sensor portion 710. Sensor portions (712, 712', 712", 712''') are wasted portions of the rectangular sensor 702. Area 713 corresponds to a wasted portion of lens 602 for which there is not a corresponding sensor portion. Area 714, included in area 713, corresponds to light captured from a portion of the viewing environment of lens 602 which included a portion of lens 604, thus lens 604 is not captured by sensor 702.

Sensor 704 includes sensor portions (716, 718, 720, 722, 722', 722", 722'''). Sensor portion 716 of sensor 704 captures light from a sky portion of the environment which was directed by lens 604, onto sensor portion 716. Sensor portion 718 of sensor 704 captures light from a main viewing area portion, e.g. horizontal viewing portion, of the environment directed by lens 604 onto sensor portion 718. Sensor portion 720 of sensor 704 captures light from a ground portion of the environment which was directed by lens 604 onto sensor portion 720. Sensor portions (722, 722', 722", 722''') are wasted portions of the rectangular sensor 704. Area 723 corresponds to a wasted portion of lens 604 for which there is not a corresponding sensor portion. Area 724, included in area 723, corresponds to light captured from a portion of the viewing environment of lens 604 which included a portion of lens 602, thus lens 602 is not captured by sensor 704.

FIG. 8 is a drawing 800 illustrating how exemplary custom wide angle lens, e.g., lens (602', 604') of the type shown in FIG. 6 and having a second shape capture light from an environment including a sky, ground and horizon portion and direct the light onto the majority of rectangular sensors (802, 804) of left and right cameras of a stereoscopic camera pair in accordance with one embodiment. Sensor 802 includes sensor portions (806, 808, 810, 812, 812', 812", 812'''). Sensor portion 806 of sensor 802 captures light from a sky portion of the environment which was directed by lens 602', onto sensor portion 806. Sensor portion 808 of sensor 802 captures light from a main viewing area portion, e.g. horizontal viewing portion, of the environment directed by lens 602' onto sensor portion 808. Sensor portion 810 of sensor 802 captures light from a ground portion of the environment which was directed by lens 602' onto sensor portion 810. Sensor portions (812, 812', 812", 812''') are wasted portions of the rectangular sensor 802. Area 813 corresponds to a wasted portion of lens 602' for which there is not a corresponding sensor portion. Area 814, included in area 813, corresponds to light captured from a portion of the viewing environment of lens 602' which included a portion of lens 604', thus lens 604' is not captured by sensor 802.

Sensor 804 includes sensor portions (816, 818, 820, 822, 822', 822", 822'''). Sensor portion 816 of sensor 804 captures light from a sky portion of the environment which was directed by lens 604', onto sensor portion 816. Sensor portion 818 of sensor 804 captures light from a main viewing area portion, e.g. horizontal viewing portion, of the environment directed by lens 604' onto sensor portion 818. Sensor portion 820 of sensor 704' captures light from a ground portion of the environment which was directed by lens 604' onto sensor portion 820. Sensor portions (822, 822', 822", 822''') are wasted portions of the rectangular sensor 804. Area 823 corresponds to a wasted portion of lens 604' for which there is not a corresponding sensor portion. Area 824, included in area 823, corresponds to light captured from a portion of the viewing environment of lens 604' which included a portion of lens 602', thus lens 602' is not captured by sensor 804.

Thus as can be appreciated from FIGS. 6, 7 and 8, by shifting the position of the sensors used with the custom fish eye lenses of the invention, capture of a portion of an adjacent camera lens can be avoided.

An alternative to using the sensor offset approach shown in FIGS. 7 and 8 is to use a custom fish eye lens which is asymmetric in the horizontal direction to avoid capture of an image of the lens of the adjacent camera in a stereoscopic camera pair. Such an approach can and in some embodiments is combined with the approach of having an asymmetry in the vertical dimension as well to capture the ground at a lower resolution than the sky. Such an approach has the disadvantage that the lenses for the left and right cameras of a stereoscopic camera pair need to be different since the left lens is asymmetric in the horizontal dimension differently than right lens assuming the lenses are also asymmetric in the vertical direction. In the case where the sky and ground are captured at the same resolution the lenses maybe symmetric in the vertical direction and an inverted lens of the same type maybe used in the right in the right camera of a camera pair while the left camera uses the lens in a non-inverted manner. The inversion shifts the asymmetry as needed to avoid capture of an image of an adjacent camera lens in such an embodiment.

Figure 10:
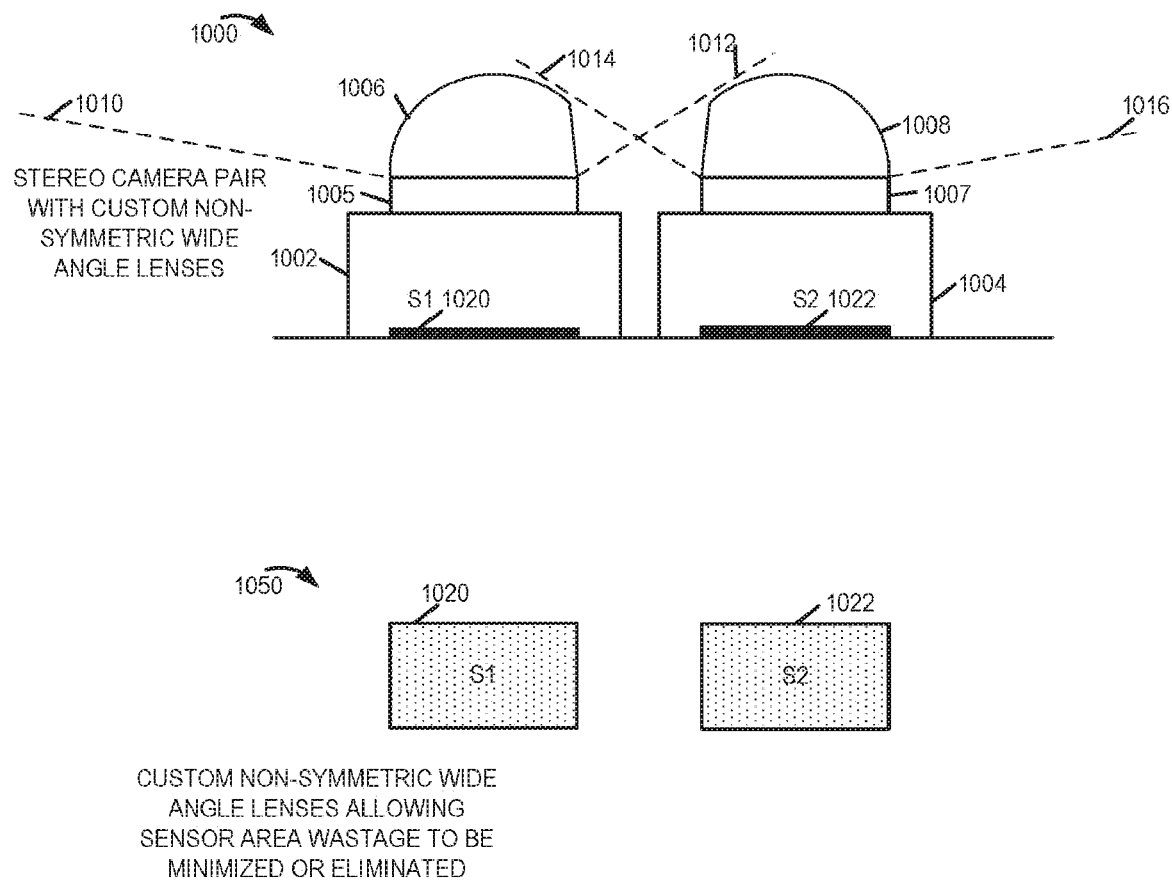
FIG. 10 illustrates how the piece elements of sensors of a stereoscopic camera pair can be efficiently used when asymmetric fish eye lenses in accordance with the invention are used to capture images of an environment.

FIG. 10 illustrates how the piece elements of sensors of a stereoscopic camera pair can be efficiently used when asymmetric fish eye lenses in accordance with the invention are used to capture images of a environment. Drawing 1000 of FIG. 10 illustrates stereo camera pair (1002, 1004) including custom non-symmetric wide angle lenses (1006, 1008), lens collars (1005, 1007), and sensor (S1 1020, S2 1022), respectively. The field of view for lens 1006 of camera 1002 is a region between dashed lines (1010, 1012). It may be observed that lens 1008 is outside of the field of view of lens 1006 of camera 1002. The field of view for lens 1008 of camera 1004 is a region between dashed lines (1014, 1016). It may be observed that lens 1006 is outside of the field of view of lens 1008 of camera 1004. In FIG. 10 the center of each sensor is aligned with the center of the lens which is placed in front of the sensor.

Drawing 1050 illustrates that the custom non-symmetric wide angles lens (1006, 1008) allow sensor area wastage to be minimized or eliminated. Sensor S1 1020 is aligned with lens collar 1005, and sensor S1 captures desired viewing area as indicated by dotted shading over the entire sensor S1 1020. Sensor S2 1022 is aligned with lens collar 1007, and sensor S2 1022 captures desired viewing area as indicated by dotted shading over the entire sensor S2 1022.

Each of the lenses described herein can be used on an individual camera or camera of a camera pair. In the case of stereoscopic camera pairs, the pairs of lenses maybe used as discussed above. Thus while many features are well suited for use with stereoscopic camera pairs individual lens can be used in individual unpaired cameras. Accordingly, any of the above described lenses can and are, depending on the embodiment, used in a camera device such as the left camera device including a camera body 902, sensor 920 and, optionally, a lense collar 905 as shown in FIG. 9. Thus the present application covers any cameras and camera pairs including the described lens configurations and/or lens and sensor placement configurations in a camera or camera system.

Figure 11:
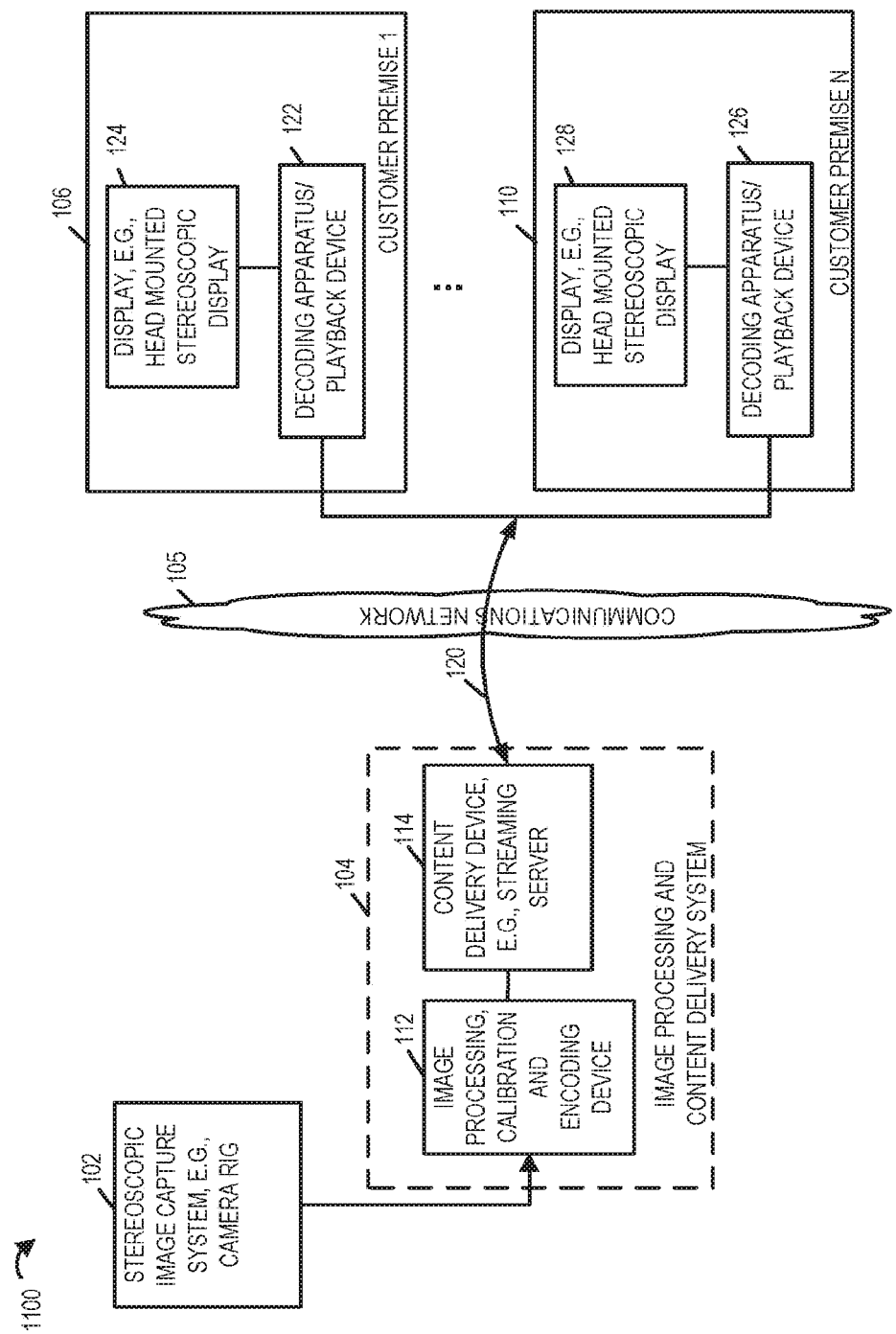
FIG. 11 illustrates an exemplary system implemented in accordance with some embodiments of the invention which can be used to capture content, stream content, and output content to one or more users playback devices in accordance with any of the embodiments described herein.

FIG. 11 illustrates an exemplary system 1100 implemented in accordance with some embodiments of the invention. The system 1100 supports content delivery, e.g., imaging content delivery, to one or more customer devices, e.g., playback devices/content players, located at customer premises. The system 1100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

Figure 1:
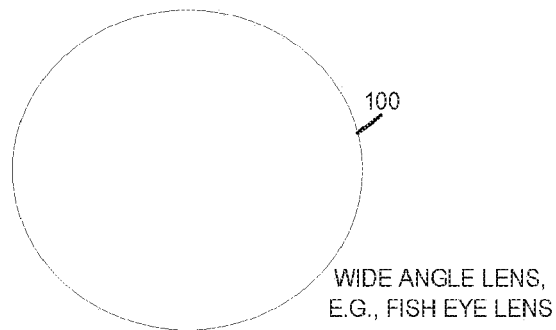
FIG. 1 illustrates a circular fish eye lens.
Figure 2:
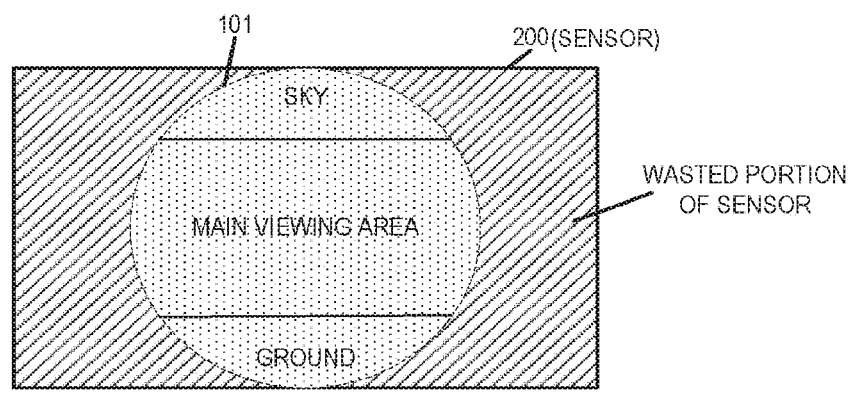
FIG. 2 illustrates how a circular fish eye lens directs light on to a rectangular camera sensor wasting large portions of the sensor.

The content delivery system 104 includes an image processing, calibration and encoding apparatus 112 and a content delivery device, e.g. a streaming server 114. The image processing, calibration and encoding apparatus 112 is responsible for performing a variety of functions including camera calibration based on one or more target images and/or grid patterns captured during a camera calibration process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be and sometimes is a function of feedback information such as viewer head position and/or user selection of a position at the event corresponding to a camera 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that while a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

Encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., decoding apparatus to decode and playback/display the image content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device.

Figure 12:
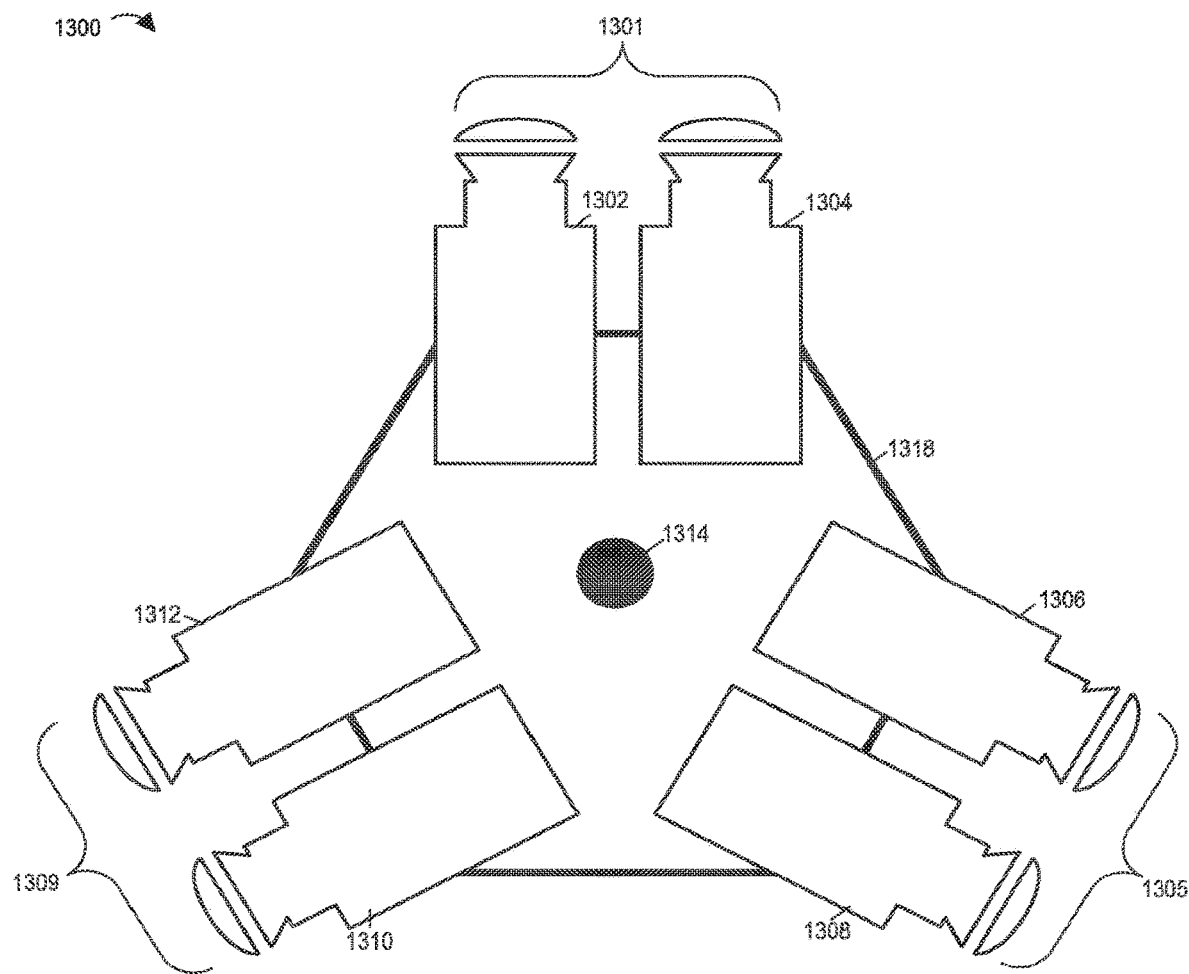
FIG. 12 illustrates a camera rig including multiple camera pairs for capturing left and right eye images corresponding to different sectors of a 360 degree field of view along with a camera or cameras directed towards the sky to capture a sky view.

To facilitate an understanding of the image capture process reference will now be made to the exemplary camera rig shown in FIG. 12. The camera rig 1300 can be used as the rig 102 of the FIG. 1 system and includes a plurality of stereoscopic pairs each corresponding to a different one of three sectors. The camera of each camera pair includes a lens, sensor and camera body. The lens and sensors maybe of the type described in any of the above discussed embodiments and the sensor to lens placement maybe as described in any of the above described embodiments. The first camera pair 1301 includes a left eye camera 1302 and a right camera 1304 intended to capture images corresponding to those which would be seen by a left and right eye of a person. Second sector camera pair 1305 includes left and right cameras 1306, 1308 while the third sector camera pair 1309 includes left and right cameras 1310, 1312. Each camera is mounted in a fixed position in the support structure 1318. An upward facing camera 1314 is also included. A downward facing camera which is not visible in FIG. 13 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event.

Figure 13:
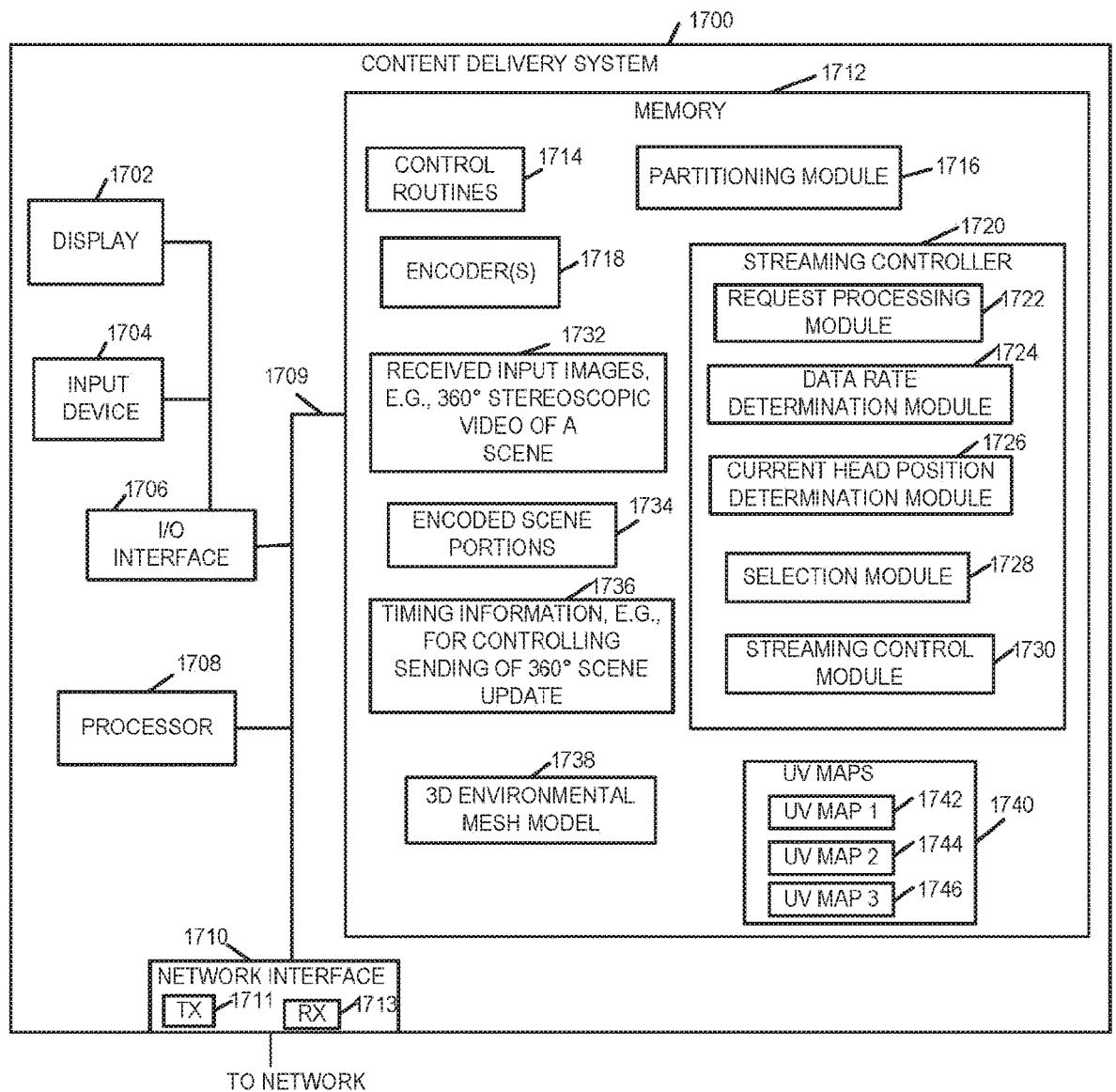
FIG. 13 illustrates an exemplary content delivery system with encoding capability that can be used to encode and stream content in accordance with the features of the invention.

FIG. 13 illustrates an exemplary content delivery system 1700 with encoding capability that can be used to encode and stream content in accordance with the features of the invention.

The system may be used to perform encoding, storage, and transmission and/or content output in accordance with the features of the invention. The content delivery system 1700 may be used as the system 104 of FIG. 1. While the system shown in FIG. 13 is used for encoding, processing and streaming of content, it should be appreciated that the system 1700 may also include the ability to decode and display processed and/or encoded image data, e.g., to an operator.

The system 1700 includes a display 1702, input device 1704, input/output (I/O) interface 1706, a processor 1708, network interface 1710 and a memory 1712. The various components of the system 1700 are coupled together via bus 1709 which allows for data to be communicated between the components of the system 1700.

The memory 1712 includes various modules, e.g., routines, which when executed by the processor 1708 control the system 1700 to implement the partitioning, encoding, storage, and streaming/transmission and/or output operations in accordance with the invention.

The memory 1712 includes various modules, e.g., routines, which when executed by the processor 1707 control the computer system 700 to implement the immersive stereoscopic video acquisition, encoding, storage, and transmission and/or output methods in accordance with the invention. The memory 1712 includes control routines 1714, a partitioning module 1716, encoder(s) 1718, a streaming controller 1720, received input images 1732, e.g., 360 degree stereoscopic video of a scene, encoded scene portions 1734, and timing information 1736. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 1714 include device control routines and communications routines to control the operation of the system 1700. The partitioning module 1716 is configured to partition a received stereoscopic 360 degree version of a scene into N scene portions in accordance with the features of the invention.

The encoder(s) 1718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 1718 is the encoded scene portions 1734 which are stored in the memory for streaming to customer devices, e.g., playback devices. The encoded content can be streamed to one or multiple different devices via the network interface 1710.

UV maps 1740 are stored in memory 1712 of the content delivery system 1700. The UV maps 1740 correspond to different resolution allocations and/or areas of the environment. For example, the first UV map 1 1742 corresponds to a first resolution allocation, the second UV map 2 1744 corresponds to a second resolution allocation, and the third UV map 1746 corresponds to a third resolution allocation. UV maps with different resolution allocations can correspond to the same area of an environment. Different UV maps corresponding to other areas of the environment can be stored in the memory 1712. Multiple UV maps may correspond to the environmental model. The mesh model of the environment where the received images were captured is stored in memory 1712 of the content delivery system 1700, e.g., 3D environmental mesh model 1738. Multiple mesh models may be stored in the memory 1712.

The streaming controller 1720 is configured to control streaming of encoded content for delivering the encoded image content to one or more customer devices, e.g., over the communications network 105. The streaming controller 1720 includes a request processing module 1722, a data rate determination module 1724, a current head position determination module 1726, a selection module 1728 and a streaming control module 1730. The request processing module 1722 is configured to process a received request for imaging content from a customer playback device. The request for content is received in various embodiments via a receiver 1713 in the network interface 1710. In some embodiments the request for content includes information indicating the identity of requesting playback device. In some embodiments the request for content may include data rates supported by the customer playback device, a current head position of the user, e.g., position of the head mounted display. The request processing module 1722 processes the received request and provides retrieved information to other elements of the streaming controller 1720 to take further actions. While the request for content may include data rate information and current head position information, in various embodiments the data rate supported by the playback device can be determined from network tests and other network information exchange between the system 1700 and the playback device.

The data rate determination module 1724 is configured to determine the available data rates that can be used to stream imaging content to customer devices, e.g., since multiple encoded scene portions are supported the content delivery system 1700 can support streaming content at multiple data rates to the customer device. The data rate determination module 1724 is further configured to determine the data rate supported by a playback device requesting content from system 1700. In some embodiments the data rate determination module 1724 is configured to determine data rates for delivery of image content based on network measurements.

The current head position determination module 1726 is configured to determine a current viewing angle and/or a current head position of the user, e.g., position of the head mounted display, from information received from the playback device. In some embodiments the playback device periodically sends current head position information to the system 1700 where the current head position determination module 1726 receives and processes the information to determine the current viewing angle and/or a current head position.

The selection module 1728 is configured to determine which portions of a 360 degree scene to stream to a playback device based on the current viewing angle/head position information of the user. The selection module 1728 is further configured to select the encoded versions of the determined scene portions based on the available data rates to support streaming of content.

The streaming control module 1730 is configured to control streaming of image content, e.g., multiple portions of a 360 degree stereoscopic scene, at various supported data rates in accordance with the features of the invention. In some embodiments the streaming control module 1730 is configured to control the streaming of N portions of a 360 degree stereoscopic scene to the playback device requesting content to initialize scene memory in the playback device. In various embodiments the streaming control module 1730 is configured to send the selected encoded versions of the determined scene portions periodically, e.g., at a determined rate. In some embodiments the streaming control module 1730 is further configured to send 360 degree scene updates to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 1730 waits for a predetermined time after initially sending N scene portions for initialization before sending the 360 degree scene update. In some embodiments the timing information to control sending of the 360 degree scene update is included in the timing information 1736. In some embodiments the streaming control module 1730 is further configured identify scene portions which have not been transmitted to the playback device during a refresh interval; and transmit an updated version of the identified scene portions which were not transmitted to the playback device during the refresh interval.

In various embodiments the streaming control module 1730 is configured to communicate at least a sufficient number of the N portions to the playback device on a periodic basis to allow the playback device to fully refresh a 360 degree version of said scene at least once during each refresh period.

What is claimed is:

1. An image capture system, comprising:
a camera comprising:
a sensor comprising pixels upon which light is directed; and
a fish eye lens that is asymmetric in at least one of a vertical direction and a horizontal direction, wherein the fish eye lens directs light from a first portion of an environment to a first set of pixels and light from a second portion of the environment to a second set of pixels, wherein the first set of pixels comprises a first number of pixels per unit area for the first portion of the environment, and wherein the second set of pixels comprises a second number of pixels per unit area for the second portion of the environment.

2. The image capture system of claim 1, wherein the fish eye lens is asymmetric in the vertical direction and symmetric in the horizontal direction.

3. The image capture system of claim 1, wherein the fish eye lens is asymmetric in both the vertical and horizontal directions.

4. The image capture system of claim 1, wherein the first number of pixels per unit area for the first portion of the environment is less than the second number of pixels per unit area for the second portion of the environment.

5. The image capture system of claim 1, wherein the fish eye lens comprises a first portion and a second portion, wherein the first portion of the fish eye lens is configured to direct light onto the first set of pixels, and wherein the second portion of the fish eye lens is configured to direct light onto the second set of pixels.

6. The image capture system of claim 5, wherein the fish eye lens further comprises a third portion, wherein the third portion of the fish eye lens is configured to direct light from a third portion of the environment to a third set of pixels, and wherein the third set of pixels comprises a third number of pixels per unit area for the third portion of the environment.

7. The image capture system of claim 6, wherein the third number of pixels per unit area for the third portion of the environment is less than the first number of pixels per unit area for the first portion of the environment and the second number of pixels per unit area for the second portion of the environment.

8. The image capture system of claim 1, further comprising: a memory; and
a processor coupled to the camera and to the memory and configured to execute program instructions stored in the memory to cause the image capture system to:
cause the camera to capture an image of the environment; and
compensate for one or more distortions in the image caused by the fish eye lens.

9. The image capture system of claim 8, wherein the one or more distortions comprise at least one of a luminance distortion and a chrominance distortion.

10. An image capture system, comprising:
at least one camera comprising:
at least one sensor comprising pixels upon which light is directed; and
at least one fish eye lens that is asymmetric in at least one of a vertical direction and a horizontal direction, wherein the at least one fish eye lens directs light from a first portion of an environment to a first set of pixels and light from a second portion of the environment to a second set of pixels, wherein the first set of pixels comprises a first number of pixels per unit area for the first portion of the environment, and wherein the second set of pixels comprises a second number of pixels per unit area for the second portion of the environment.

11. The image capture system of claim 10, wherein the first number of pixels per unit area for the first portion of the environment is less than the second number of pixels per unit area for the second portion of the environment.

12. The image capture system of claim 10, wherein the third number of pixels per unit area for the first portion of the environment is the same as the first number of pixels per unit area for the first portion of the environment.

13. The image capture system of claim 10, further comprising:
a first camera comprising a first sensor and a first fish eye lens; and
a second camera comprising a second sensor and a second fish eye lens.

14. The image capture system of claim 13,
wherein the first camera and the second camera comprise a stereoscopic camera pair, and
wherein a center of the first fish eye lens is horizontally offset from a center of the first sensor such that an image captured by the first camera does not include a portion of the second fish eye lens.

15. The image capture system of claim 13,
wherein the second fish eye lens is positioned adjacent the first fish eye lens, and
wherein a portion of the second fish eye lens obscures a portion of a field of view of the first fish eye lens.

16. The image capture system of claim 15, wherein the first sensor is offset with respect to a center of the first fish eye lens such that a portion of light passing through the first fish eye lens is not collected by the first sensor.

17. The image capture system of claim 16, wherein the portion of light passing through the first fish eye lens that is not collected by the first sensor comprises light corresponding to the portion of the second fish eye lens that obscures the portion of the field of view of the first fish eye lens.

18. The image capture system of claim 16, wherein the second sensor is offset with respect to a center of the second fish eye lens such that a portion of light passing through the second fish eye lens is not collected by the second sensor.

19. The image capture system of claim 18, wherein the offset of thesecond sensor is substantially equal and opposite the offset of the first sensor.

* * * * *

UNITED STATES PATENT AND TRADEMARK OFFICE
CERTIFICATE OF CORRECTION

PATENT NO. : 11,381,802 B2
APPLICATION NO. : 16/917377
DATED : July 5, 2022
INVENTOR(S) : Cole et al.

It is certified that error appears in the above-identified patent and that said Letters Patent is hereby corrected as shown below:

In the Claims

Claim 19, at Column 18, Line 34 - replace "thesecond" with -- the second --

Signed and Sealed this
Ninth Day of August, 2022

Katherine Kelly Vidal
*Director of the United States Patent and Trademark Office*